(12) United States Patent
Hampton (10) Patent No.: US 10,501,292 B2
(45) Date of Patent: Dec. 10, 2019

(54) WINCH

(71) Applicant: Kite Power Systems Limited, Glasgow (GB)

(72) Inventor: William Hampton, Glasgow (GB)

(73) Assignee: Kite Power Systems Limited, Glasgow (GB)

( * ) Notice: Subject to any disclaimer, the term of this patent is extended or adjusted under 35 U.S.C. 154(b) by 202 days.

(21) Appl. No.: 15/531,137

(22) PCT Filed: Nov. 27, 2015

(86) PCT No.: PCT/GB2015/053618
§ 371 (c)(1),
(2) Date: May 26, 2017

(87) PCT Pub. No.: WO2016/083822
PCT Pub. Date: Jun. 2, 2016

(65) Prior Publication Data
US 2017/0320711 A1    Nov. 9, 2017

(30) Foreign Application Priority Data

Nov. 27, 2014  (GB) .................................. 1421060.3

(51) Int. Cl.
*B66D 1/36* (2006.01)
*B66D 1/38* (2006.01)
(Continued)

(52) U.S. Cl.
CPC .............. *B66D 1/365* (2013.01); *B66D 1/38* (2013.01); *B66D 1/60* (2013.01); *F03D 5/00* (2013.01); *F05B 2240/92* (2013.01); *Y02E 10/70* (2013.01)

(58) Field of Classification Search
CPC . B66D 1/365; B66D 1/38; B66D 1/50; B66D 1/52; B66D 1/60; F03D 5/02; F03D 5/06; F05B 2240/921
See application file for complete search history.

(56) References Cited

U.S. PATENT DOCUMENTS 3,524,606 A * 8/1970 Coski ................. B65H 75/4402
                                                    242/484
4,166,596 A * 9/1979 Mouton, Jr. ............... B64B 1/50
                                                    244/30
(Continued)

FOREIGN PATENT DOCUMENTS

CN      101240778 A    8/2008
FR      2743359 A1     7/1997
(Continued)

*Primary Examiner* — Emmanuel M Marcelo
(74) *Attorney, Agent, or Firm* — Benesch, Friedlander, Coplan & Aronoff LLP (57) ABSTRACT

A winch for a power generating system using a tethered airborne device, the winch comprising a drum rotatable about its main axis a guiding apparatus arranged to guide an airborne device tether to wind and unwind around the drum; wherein the drum is rotatable relative to a pivot point to move in a first plane and the guiding apparatus is disposed relative to the drum to move along part of an orbital path around the drum in a second plane substantially perpendicular to the main axis of the drum, thereby allowing alignment of the winch with respect to an unwound length of the tether.

18 Claims, 5 Drawing Sheets

(51) Int. Cl.
  *F03D 5/00* (2006.01)
  *B66D 1/60* (2006.01)

(56) References Cited

U.S. PATENT DOCUMENTS

| | | | |
|---|---|---|---|
| 6,523,781 B2 | 2/2003 | Ragner | |
| 7,188,808 B1* | 3/2007 | Olson | F03D 5/00 244/153 R |
| 8,134,249 B2 | 3/2012 | Ippolito et al. | |
| 9,214,022 B1* | 12/2015 | Hallamask | B64F 1/02 |
| 9,248,999 B2 | 2/2016 | Xydias | |
| 9,321,518 B1* | 4/2016 | Rabbino | B64B 1/50 |
| 2002/0040948 A1 | 4/2002 | Ragner | |
| 2006/0237565 A1* | 10/2006 | Barker | A01K 89/0114 242/229 |
| 2007/0126241 A1* | 6/2007 | Olson | F03D 5/04 290/55 |
| 2007/0231072 A1* | 10/2007 | Jennings | F03B 13/10 405/75 |
| 2009/0278353 A1* | 11/2009 | Da Costa Duarte Pardal | F03D 5/00 290/44 |
| 2010/0013225 A1* | 1/2010 | Ippolito | F03D 3/062 290/44 |
| 2012/0086210 A1* | 4/2012 | Gray | F03D 5/00 290/55 |
| 2012/0175576 A1 | 7/2012 | Xydias | |
| 2013/0078097 A1* | 3/2013 | Milanese | F03D 5/00 416/170 R |
| 2013/0221679 A1* | 8/2013 | Vander Lind | B64C 31/06 290/55 |
| 2015/0048621 A1 | 2/2015 | Smeenk et al. | |
| 2015/0076266 A1* | 3/2015 | Crawford | B66D 1/38 242/156.1 |
| 2015/0158600 A1* | 6/2015 | Hachtmann | B64F 3/00 244/110 E |
| 2015/0183529 A1* | 7/2015 | Hachtmann | B64F 3/00 254/266 |
| 2015/0308410 A1* | 10/2015 | Goldstein | F03D 5/06 290/55 |
| 2016/0013703 A1 | 1/2016 | Marzelius et al. | |
| 2019/0031340 A1* | 1/2019 | Patten | B64C 39/022 |

FOREIGN PATENT DOCUMENTS

| | | |
|---|---|---|
| JP | 2010064895 A | 3/2010 |
| WO | 200206146 A1 | 1/2002 |
| WO | 2013147600 A2 | 10/2013 |
| WO | 2014120058 A1 | 8/2014 |

* cited by examiner

WINCH

FIELD

The invention relates to a winch for power generation from a kite or other tethered airborne device.

BACKGROUND

People have tried to harness wind energy for thousands of years. Lately, with fossil fuels running out, techniques for converting energy in the wind to other forms of energy and, in particular, electrical energy have become more popular. It is known to use wind turbines to extract the energy from the wind. It is also known to use kites to extract energy from the wind. Kites can fly at high altitudes where wind speeds are more reliable than the wind speed at the height of the hub of a wind turbine. The hub height of a wind turbine may be at 80 or 100 m whereas kites can be flown at a typical height of 400 to 700 m or even higher. With kite-based power generating systems, the majority of the mass is kept near to ground or water level at a base station, thereby minimising bending moments and reducing the mass of the airborne equipment considerably. Repair and service of the equipment is easier since the bulk of the equipment is at low-level. At sea, the ground based equipment can be mounted on towable barges or buoys allowing retrieval to harbour for major repair or service.

A system for the extraction of energy from the wind using a kite typically includes a kite connected to a base station using a tether. The tethers used in kite-based power generating systems undergo considerable stress during operation due to the relatively high forces involved. It is necessary to replace exhausted tethers once they have deteriorated. The maintenance thus required has a cost in terms of time when the system is not in use as well as a financial cost. The invention was devised in this context.

SUMMARY

A first aspect of the invention provides a winch for a power generating system using a tethered airborne device, the winch comprising:
  a drum rotatable about its main axis;
  a guiding apparatus arranged to guide an airborne device tether to wind and unwind around the drum;
  wherein the drum is rotatable relative to a pivot point to move in a first plane and the guiding apparatus is disposed relative to the drum to move along part of an orbital path around the drum in a second plane substantially perpendicular to the main axis of the drum, thereby allowing alignment of the winch with respect to an unwound length of the tether.

The drum may have a centre of gravity located between the pivot point and the unwound length of the tether.

The guiding apparatus may be arranged to move along part of the orbital path around the drum by moving along a curved track that is coaxial with respect to the drum and extends along a section of the orbital path.

The guiding apparatus may comprise a guide piece to guide the tether on to a part of the drum proximate the guide piece when the winch is in a winding mode and to guide the tether away from a part of the drum proximate the guide piece when the winch is in an unwinding mode.

The guide piece may be arranged to move bidirectionally along a longitudinal track substantially parallel to the main axis of the drum and wherein the drum is fixed.

The winch may further comprise a turntable on which the drum is mounted so that the main axis of the drum sits in a substantially horizontal plane, wherein the turntable is rotatable about a substantially vertical axis.

The winch may further comprise a mast mounted on and fixed with respect to the turntable, the mast being arranged to facilitate launch and capture of the tethered airborne device.

The winch may further comprise rails on which the drum is arranged to shuttle bidirectionally and a controller configured to control the movement of the drum with respect to the guiding apparatus to ensure alignment of the guiding apparatus with a particular region of the drum.

The winch may further comprise rails on which the drum is arranged to shuttle bidirectionally provided with a screw thread having a crossing helix.

The winch may further comprise a cradle in which the drum is secured, wherein the drum is arranged to be rotatable in a substantially vertical plane.

The winch may further comprise a motor configured to actuate movement of the drum around the pivot point.

The winch may further comprise a controller to control movement of the drum in the first plane and movement of the guiding apparatus in the second plane in accordance with an airborne device flight plan.

The tether may be a ribbon.

The tethered airborne device may be a kite.

A second aspect of the invention provides a winching system for plural tethered airborne devices, the system comprising a plurality of rotatable turntables coupled to a central column wherein a respective winch is mounted on each turntable.

The plurality of turntables may be coupled to the central column by at least one movable arm.

Each of a plurality of movable arms may be movable independently of each of the other movable arms.

The system may further comprise a drive motor and a controller coupled to said drive motor, wherein the controller may be configured to control the drive motor to orientate one or more of the respective turntables and arms to a desired orientation.

The system may further comprise respective masts mounted on each of the turntables, the masts being arranged to facilitate launch and capture of the tethered airborne devices.

The respective winch mounted on each platform may be a winch according to the first aspect of the invention.

BRIEF DESCRIPTION OF THE DRAWINGS

Embodiments of the invention will be described, by way of example only, with reference to the accompanying figures, in which.

DETAILED DESCRIPTION

Embodiments of the invention provide a winch which is configured to allow a tether to unwind during a power generating mode and wind the tether onto the drum in an efficient manner while reducing the wear on the tether. This is done by providing movement of components of the winch relative to the tether to allow alignment therewith. As such, stresses on the tether are reduced in comparison with winches that are known in the aft. The lifetime of the tether may be extended, thereby reducing the frequency of costly maintenance outages.

Figure 1:
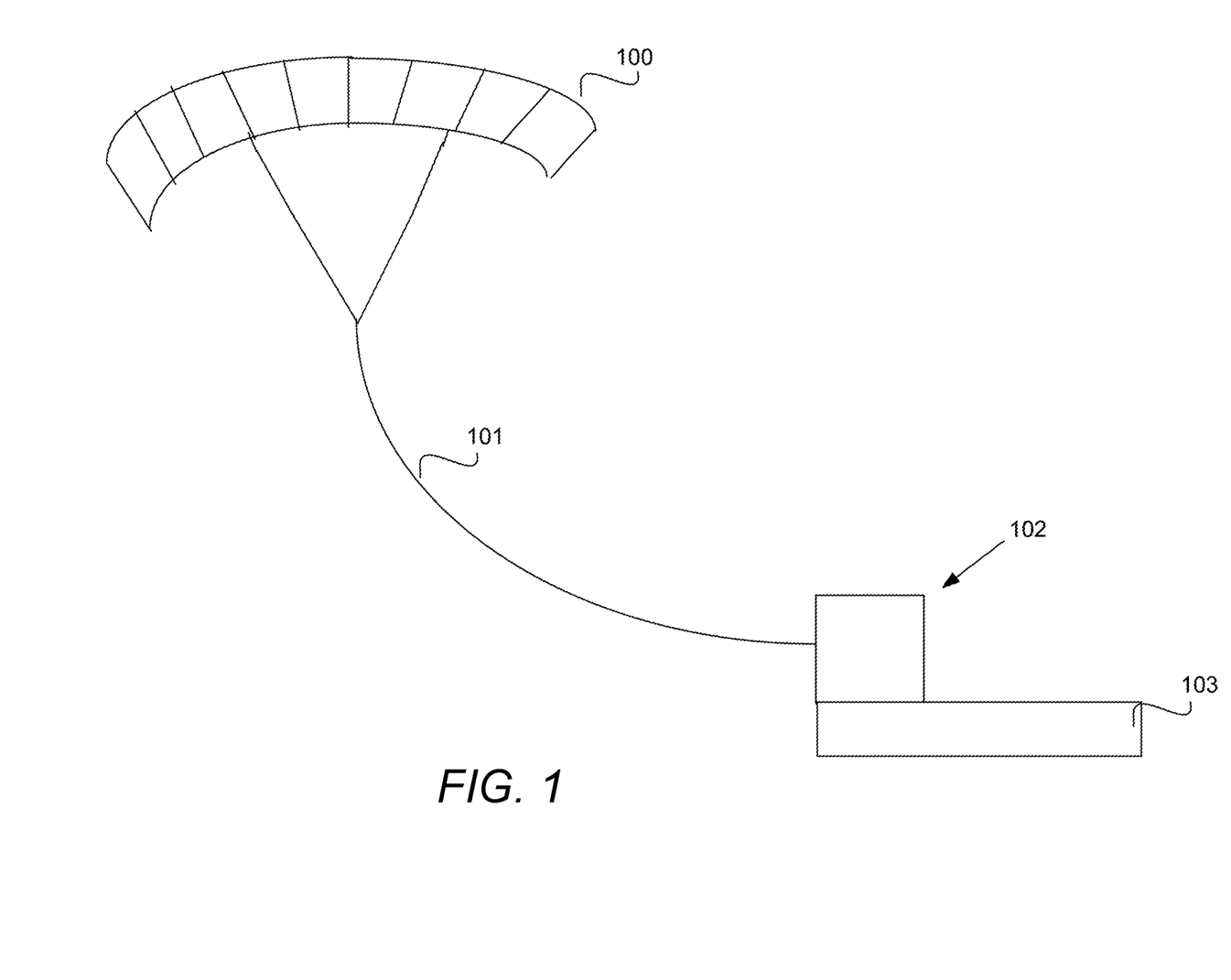
FIG. 1 is schematic diagram of a kite system.

FIG. 1 shows a kite system according to embodiments of the present invention, in use. A kite 100 is attached, via a tether 101, to a base station 102. The base station 102 may be located on land or at sea on a suitable platform 103 on a vehicle or boat. The tether 101 is wound on to a winch comprising a cylindrical drum such as the winch shown in FIG. 2. The tether can be unwound and wound depending on whether the kite is being released or retracted.

The winch on a kite system is not only used for storing the tether but it is also the method for transferring mechanical power into electrical energy or usable power. As the kite travels away from the winch using its prescribed path, the length of tether is pulled off the drum causing the drum to rotate about its main axis or, in other words, to spin about its main axis. The rotation of the drum about its main axis is used to drive an alternator, generator or pumping apparatus that may be mounted on to the drum via a gearbox or alternatively a hydraulic transmission system could be used so that the generator or other power generating apparatus or pumping apparatus can be mounted remotely.

At the end of the power-generating cycle the drum is reversed to wind in the tether and the kite is flown out of the power generating window or feathered in some way, such as by reducing the angle of attack (pitching forwards), so as to reduce the kite's drag. Winding in the tether can be performed in a number of different ways, such as: using the electrical generating equipment as a motor and running it in reverse, having a second motor gearbox arrangement on the opposite end of the drum that is used for winding the tether back in, reversing the hydraulic transmission while providing hydraulic fluid at pressure from an accumulator or another power source.

During operation of the system, the minimum number of bending actions that the tether can experience per complete cycle is two, the winding onto the drum and the winding off from the drum.

A tethered kite is flown in a region of airspace in which it can generate a high tension in the tether, which tension is used to rotate the drum about its main axis. The centre of this region of airspace typically lies directly downwind of the base station and at an angle of elevation from the base unit dependent on, for example, the design of the kite, the limitations of the power generation equipment and the wind speed. The region in which the appropriately high tension can be generated may be considered as 'the centre of the wind'. If the kite moves away from the centre of the wind, in either azimuth or elevation, the amount of tension it can generate in the tether may be less than optimum from the system for extracting energy from the wind. It is therefore desirable to keep the kite near the centre of the wind and also to control the kite to move at a high speed in the wind.

As the tether is unwound, it is desirable to steer the kite so that it follows a flight path that keeps the kite in the 'centre of the wind'. The kite can be steered in a number of ways including adjusting various adjustable portions (such as flaps) on the kite body and adjusting the position of the tether and the bridle. The steering of the kite can be controlled using a controller programmed with a predetermined flight path. Suitable flight patterns for the kite include a figure of eight or a continuous loop pattern. If the power is to be generated at ground level and not on the wing then during the power generating phase, when the kite is flying in a loop or figure of eight pattern line is being continuously pulled off of the drum spinning the electrical generator.

As stated above, when the power stroke is finished the line of tether needs to be retracted. During the retract stage it is necessary to minimise the force generated by the kite. To do this the kite may be flown to the edge of the power generating area of the wind. The closer the position of the kite is to 90° of the wind direction, the lower the resistance. All of these manoeuvres create an angular change at the winch, this means that the winch needs to be actively moved to allow the winch to lay line onto the drum.

Figure 2:
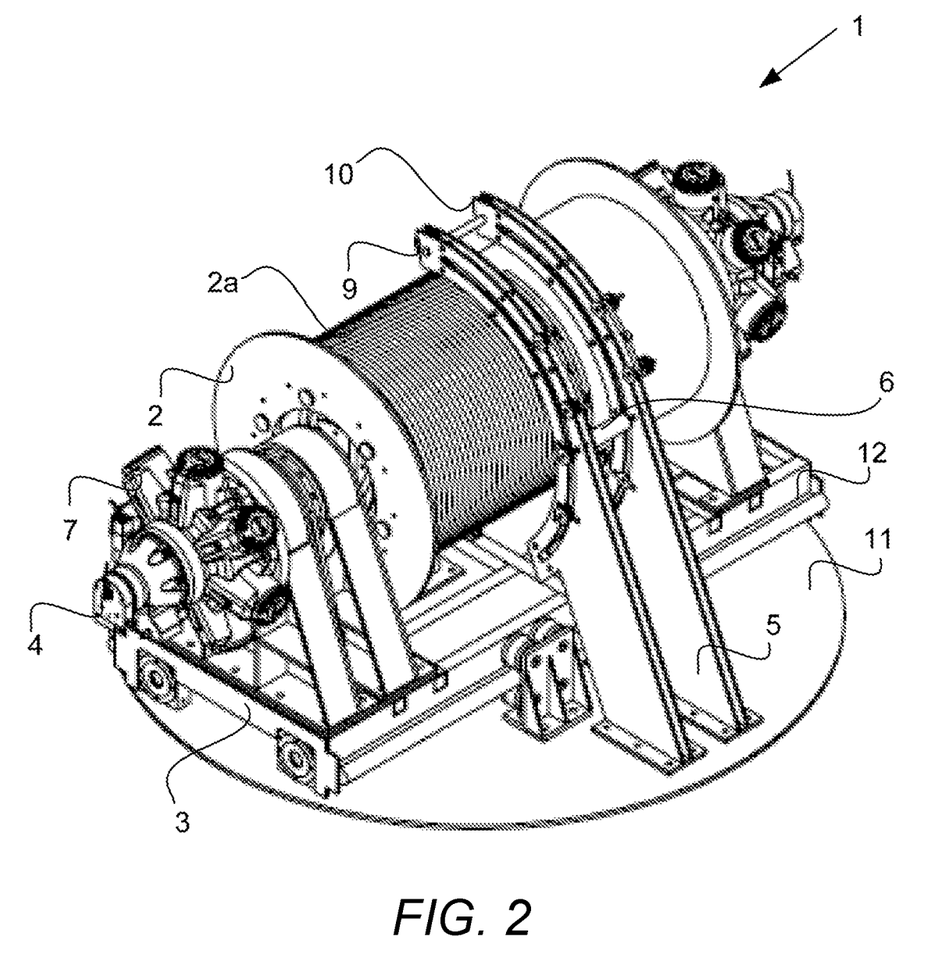
FIG. 2 shows an embodiment of a winch.

FIG. 2 shows a winch 1 according to a first embodiment of the invention. The winch 1 comprises a generally cylindrical drum 2, mounted on a carriage 3. The cylindrical drum 2 is mounted to the carriage 3 through an axle 4 extending along the cylindrical axis of the drum and connected to the carriage 3, allowing the drum 2 to rotate about its cylindrical axis. The cylindrical drum 2 has a curved surface around a central region 2a for receiving and storing the tether 101 and flanges at either end to prevent the tether from slipping off at either end of the drum.

The winch 1 comprises a generator 7 coupled to the rotatable drum 2. The generator 7 comprises a rotor part coupled to the drum and a stator part. As the rotor rotates with the drum 2 power is generated. Various generator configurations may be employed therefore further discussion of the generator will be omitted.

The winch also comprises a tether guiding apparatus 5. The tether guiding apparatus 5 comprises a tether guide piece 6 which feeds the tether 101 (shown in FIG. 3) onto the drum 2. The guide piece 6 is housed in respective curved tracks 9, 10. The curved tracks 9, 10 curve around the drum 2 to follow a path which forms a section of an orbital path around the drum 2. The tether guiding apparatus 5 can thus follow a curved path around the drum 2. The tether guide piece 6 may be provided with an aperture through which the tether 101 is threaded, dimensioned so as to hold the tether 101 securely in place while allowing it to feed through in either direction depending on whether the tether 101 is being wound or unwound.

As will be explained in more detail below, the relative motion of the guide piece 6 with respect to the drum 2 allows for efficient winding and unwinding of the tether 101 from the drum 2.

The winch 1 comprises a turntable 11 on a slew bearing which allows the winch 1 to rotate about a vertical axis. As the winch rotates about the vertical axis, the drum can be rotated to a desired azimuthal orientation with respect to the deployed length of tether. A drive system comprising a motor and controller is coupled to the turntable 11 so that accurate alignment of the drum with respect to the tether is maintained.

The alignment of the winch in the azimuthal direction is effected using a controller. The controller may be programmed with the predetermined flight path of the kite 100 so that the rotation of the drum respective to the vertical axis can be varied to comply with the kite flight path, for example a figure of eight or a continuous loop. The controller sends control signals to the motor to ensure alignment of the winch with the tether.

The kite position may also be monitored by a human operator who can control the position of the kite by entering positional information regarding the kite at a user input which is connected to the controller. Servo mechanisms may also be used to compensate automatically for any deviations in the flight path of the kite.

Sensors may be located in the kite itself which detect parameters such as wind speed, kite speed and kite position and relay this information to the base station. This information may be analysed by the controller automatically to adjust the control signals to take into account changing conditions. Additionally or alternatively, this information may be displayed to a user so that they can enter instructions manually to alter the flight path.

Alternatively, the airspace above the base station may be monitored using a camera and the kite position tracked using image recognition software. The controller may then determine the position of the kite automatically and send control signals to control the position of the kite.

The controller also controls the position of the kite when the kite is to be retracted. As stated above, it is necessary to alter the position of the kite to reduce drag before winding in the kite.

Figure 3:
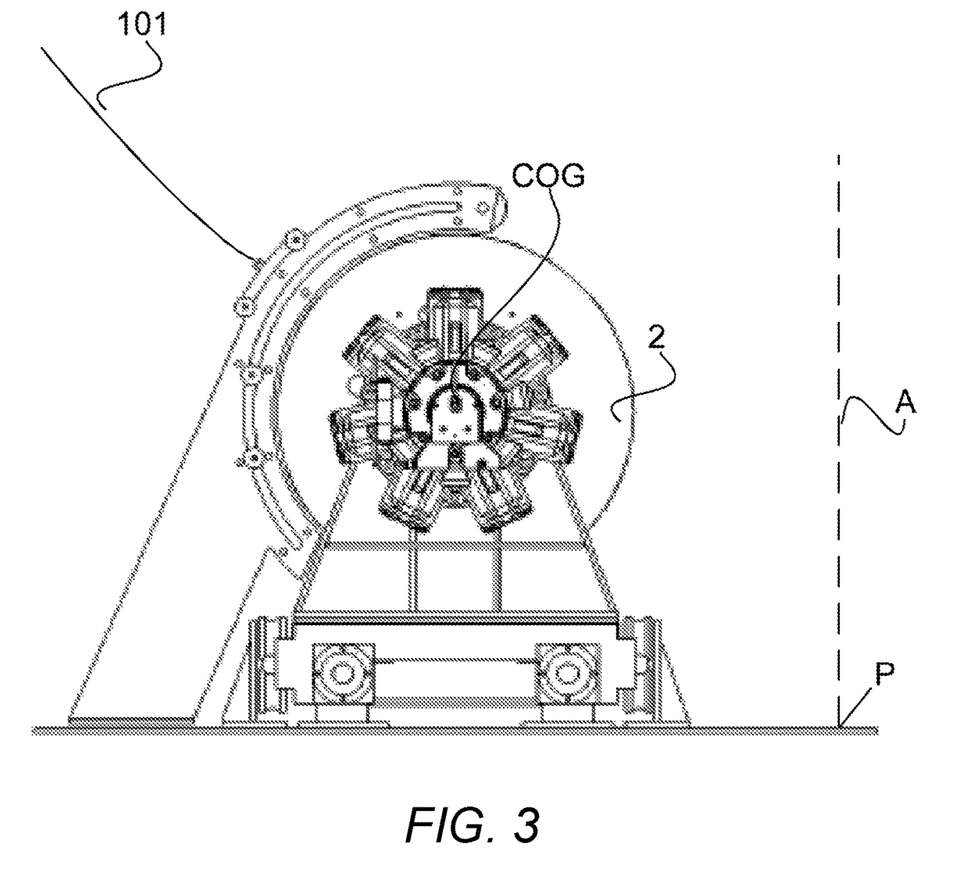
FIG. 3 is a side-on view of the winch shown in FIG. 2.

As shown in FIG. 3, the centre of gravity (COG) of the drum 2 is situated forward of the vertical axis A of rotation of the winch 1. In other words, the centre of gravity of the drum 2 is located between the point P around which the drum 2 pivots and the length of tether 101 that has been unwound from the winch 1 and which is attached to a kite or other airborne device. The advantage of this arrangement is that the tension exerted on the tether by the kite causes the winch 1 to rotate to provide at least partial self-alignment in an azimuthal direction with respect to the kite. This configuration reduces the parasitic loads on the alignment motor used to rotate the drum 2 around the vertical axis A.

The tether guiding apparatus 5 is free to move along the curved tracks 9, 10 to ensure that the tether feeds onto the drum without bending. The tensile force in the tether 101 pulls the tether guiding apparatus 5 into elevational alignment with the tether 101 and kite.

As such, the winch 1 can be aligned with the tether 101 in an azimuthal direction by rotating about a vertical axis of the turntable 11 and in an elevational direction. This is advantageous because the tether can be fed on to and wound around the drum 2 with relatively few bending movements. By reducing the number of bending movements in the tether, the tether lifetime can be prolonged.

The winch 1 shown in FIG. 2 provides for efficient unwinding and winding of the tether 101 around the drum 2. The winch 1 comprises a driven mechanism for moving the drum relative to the guide piece, which may for instance utilise hydraulic rams or electrical actuation. In the embodiment shown in FIGS. 2 and 3, the carriage 3 is mounted on drum shuttling rails 12 so that the drum 2 is free to shuttle back and forth along the rails. As the tether is unwound from or wound onto the drum the carriage moves along the rails so that the guide piece is kept proximate to the part of the drum on which the tether is to be wound or unwound. Means for shuttling the drum can include a hydraulic cylinder, a screw thread or any other suitable linear actuator. The drum shuttling rails 12 may be provided with a screw thread (not shown) having a crossing helix so that the drum's position is controlled mechanically without the need for an electronic controller. A suitable example is the self reversing screw produced by ABSSAC Ltd of Evesham, UK.

As the tether is being unwound or wound on to the drum 2, the carriage 3 is driven to be moved along the drum shuttling rails 12. The movement of the carriage 3 along the drum shuttling rails 12 results in a relative movement of the drum with respect to the guide piece 6. This movement is timed so that, on average, the drum moves a lateral distance approximately equal to the width of the tether in the time it takes to wind a length of tether equal to the circumference of the drum on to the surface 2a of the drum.

Once the guide piece is proximate an end of the drum, the carriage 3 may then be shuttled in the opposite direction, allowing multiple layers of tether to be stored on the drum. The result of this timed relative movement is that consecutive windings of the tether on the drum are closely packed and a continuous layer of tether is therefore laid on to the drum 2.

When the tether is being unwound, the drum is rotated in an opposite direction about its cylindrical axis as a result of the tensile force exerted by the kite. The carriage is also shuttled in the unwinding mode so that the guide piece is kept close to the portion of tether being unwound.

Maintaining a close proximity in a longitudinal direction between the guide piece and the part of the drum on which the tether is being wound or from which the tether is being unwound further reduces bending of the tether. The tether may also be stowed in a way that uses space efficiently, thereby allowing for generally smaller drums to be used.

The configuration described above involves shuttling the drum with respect to the guide piece. Alternatively, the guide piece 6 may be moved relative to the drum 2. In this embodiment, instead of providing rails on which the drum is shuttled back and forth, the drum is stationary (apart from being rotated) while the guide piece moves back and forth along a longitudinal rail (not shown) provided as part of the guiding apparatus 5. The shuttling movement of the guide piece along the rail is timed to achieve the close winding of the tether around the drum.

In this variation on the above-described embodiment, the curved tracks 9, 10 are spaced apart from each other by a separation approximately equal to the central part 2a of the drum 2. A longitudinal rail sits in the curved tracks 9, 10. The guide piece 6 sits on the longitudinal rail and is free to slide back and forth along the longitudinal rail. The longitudinal movement of the guide piece 6 can be performed using a linear actuator.

In this variation, the winch need not be provided with shuttling rails since the relative movement of the guide piece and the drum is achieved by the movement of the guide piece rather than the movement of the drum as shown in FIG. 2.

In some embodiments of the invention, the tether is substantially ribbon shaped. That is to say, the tether has a width substantially larger than its depth. Having a ribbon shape allows the tether to be stowed compactly on the drum. This is especially advantageous where the tether is stored in multiple layers wound around the drum. Thus is because the reduced diameter of the drum reduces the torque exerted on the tether.

The tether may be formed from any suitable material known in the art. However, in some embodiments the tether is formed from an ultrahigh molecular weight polyethylene (UHMWP) material such as Dyneema. Tethers made from Dyneema have high yield strengths and are therefore durable, having extended lifetimes.

Figure 4:
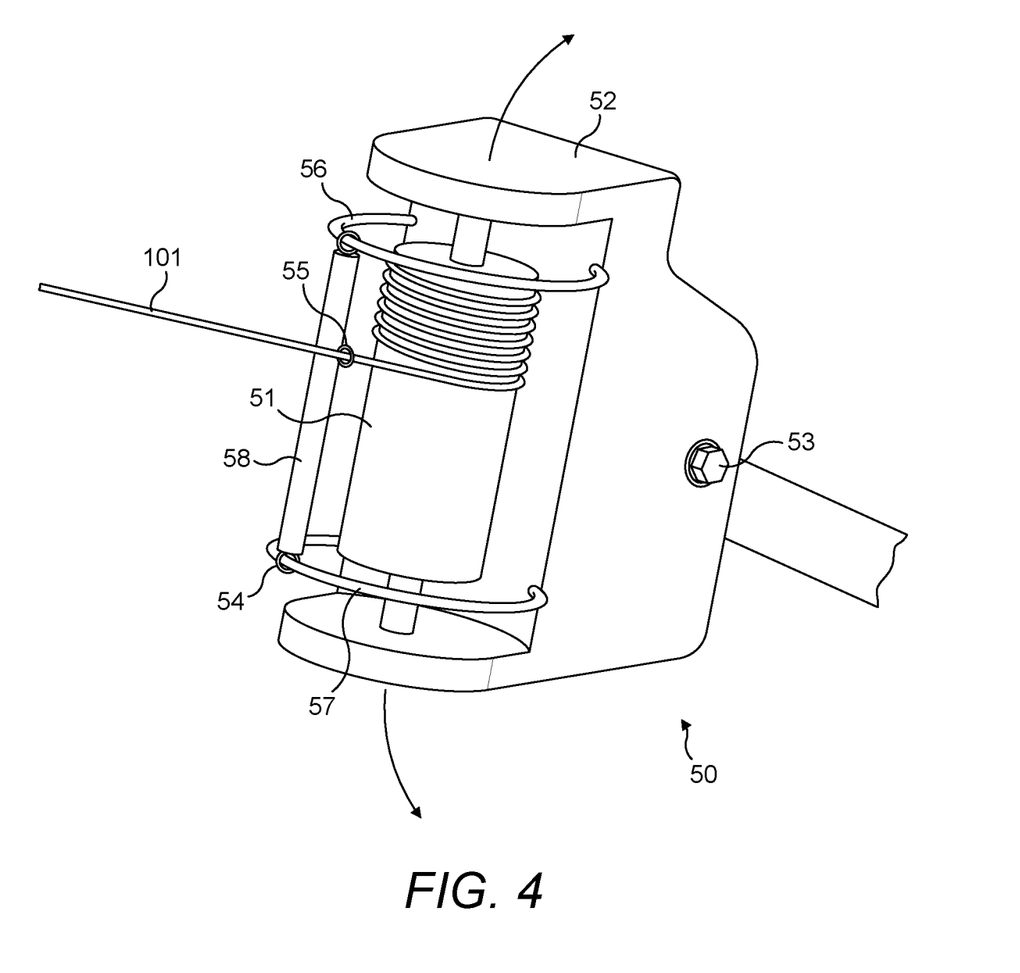
FIG. 4 shows a second embodiment.

FIG. 4 shows an alternative winch 50 according to a further embodiment of the invention. In this second embodiment, the winch comprises a drum 51, supported at either end of its cylindrical axis by a cradle 52. The cradle 52 supports the drum 51 to sit in the vertical plane (i.e. the plane of the page). The cradle 52 comprises a pivot 53 allowing the drum 51 to rotate in the vertical plane.

The winch 50 comprises a guiding apparatus 54. The tether guiding apparatus 54 comprises a guide piece 55 mounted on a longitudinal rail 58. The guide piece can move back and forth along the rail 58. The winch 50 also comprises curved tracks 56, 57 situated at respective ends of the drum 51. In a similar manner to the curved tracks 9, 10 in the first embodiment, the curved tracks 56, 57 at least partially surround the drum 51. The tether guiding apparatus 54 is supported by the curved tracks 56, 57. The tether guiding apparatus 54 is thus able to move along an orbital path around the cylindrical drum 51 in a plane that is substantially perpendicular to the cylindrical axis of the drum.

The movement of the tether guiding apparatus 54 in this plane provides the azimuthal alignment of the winch 50 with the tether. The position of the tether guiding apparatus 54 may be controlled by a suitable drive mechanism in communication with a controller operable to control the position of the tether guiding apparatus 54. The controller can be programmed to follow a flight plan and send signals to the drive mechanism to ensure that the tether guiding apparatus 54 is in the correct position.

To allow alignment of the winch 50 in the elevational direction, the cradle 52 can move about the pivot 53 in the vertical plane. The pivot 53 may be provided with a motor coupled to the controller.

Furthermore, the centre of gravity of the drum 51 is located between the pivot 53 and the unwound length of tether connected to the kite. This configuration allows for a degree of self-alignment of the winch 50 with the tether so that the winch is not entirely reliant on the drive mechanism to align the winch elevationally and azimuthally. As such, parasitic loads may be reduced.

In a similar manner to the alternative configuration of the winch 1, the guide piece 55 can be shuttled along a longitudinal rail 58 to allow for the tether to be laid onto the drum 51 in a continuous layer and to facilitate the picking up of the tether when the winch is in the unwinding mode.

While two embodiments of winches have been described in which the drum may be moved in a horizontal and vertical plane, respectively, it should be understood that the drum may be supported to rotate in any plane, with the tether guiding apparatus arranged to move in a second plane that is substantially perpendicular. This arrangement allows for alignment of the winch both azimuthally and elevationally in order to reduce wearing of the tether.

To minimise the number of bending actions it is necessary to have the tether fed directly to the winch drum without bending substantially over a pulley. In embodiments of the invention that employ pulleys, these are for guidance only and do not exert a force on the tether greater than 10% of the peak tensile force. Such pulleys can be mounted in the guiding apparatus.

The winches 1, 50 may be coupled to a mast (not shown) for launching and capturing airborne devices. The mast can be any type of mast that is known to those skilled in the art for the launch and capture of airborne devices used in electricity generation systems. The mast can comprise a track located at an upper end thereof for guiding the airborne device as it is launched and captured. Alternatively, the mast can be of a type that is articulated so that it folds down to aid launch and capture.

Figure 5A:
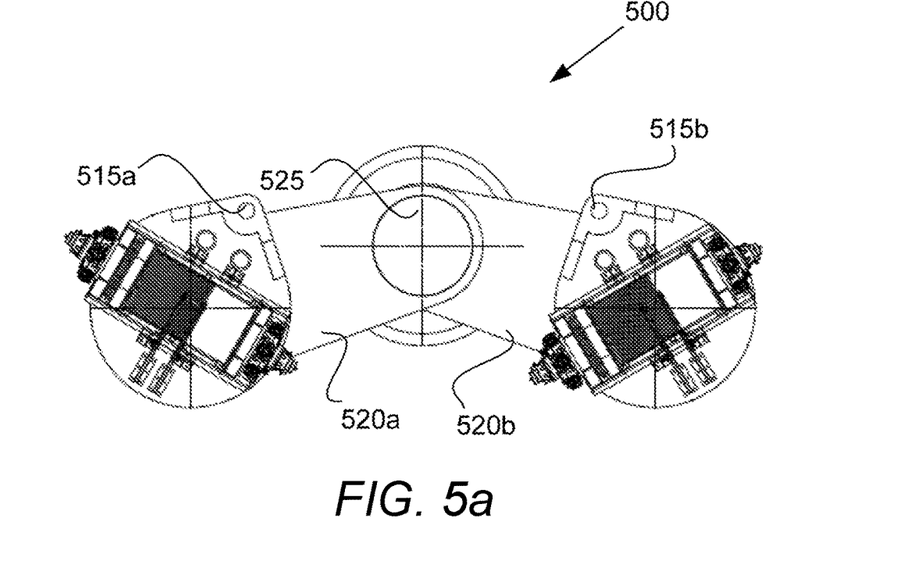
FIGS. 5A and 5B show a winching system.
Figure 5B:
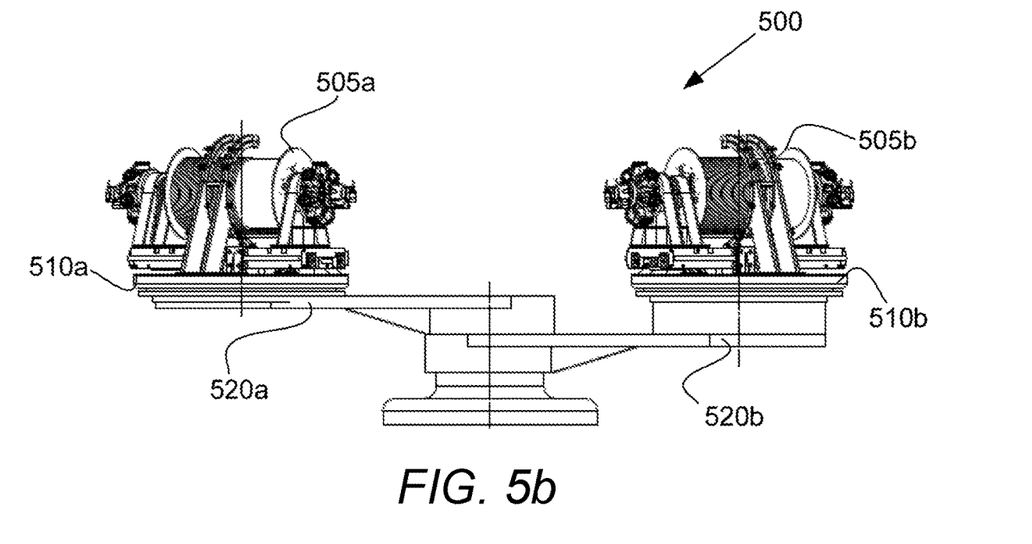

FIGS. 5A and 5B show a multiple winch system 500. Systems comprising multiple winches are advantageous because they allow for at least one airborne device to be deployed in an electricity generating mode while another airborne device is being wound in. As such, electricity can be generated constantly.

The winching system 500 shown in FIG. 5 comprises two winches 505 of a type substantially similar to the winch 1 described above. Each winch is mounted on a turntable 510 rotatable about its vertical axis. A mast 515 is mounted on each of the turntables 510. As such, the winch 505 and respective mast 515 are arranged to be fixed to the turntable 510 so that they rotate together as the turntable rotates. Locating the winch and mast on the turntable is an advantageous arrangement because it allows alignment of both the winch and the mast with respect to the airborne device. This allows the airborne device to be launched and captured whilst also reducing the wear on the tether. Furthermore, aligning the mast with the direction of the airborne device allows the launch and capture to be performed quickly, thereby reducing the time during which the apparatus is idle. As described above with reference to the winch 1, the centre of gravity of the drum may be located in front of the axis of the turntable to reduce the parasitic loads on the turntable drive motor.

The mast 515 can be any type of mast that is known to those skilled in the art for the launch and capture of airborne devices used in electricity generation systems. The mast 515 can comprise a track (not shown) located at an upper end thereof for guiding the airborne device as it is launched and captured. Alternatively, the mast 515 can be articulated so that it folds down to aid launch and capture.

Each turntable 510 is located at the end of a respective arm 520. Having a separate arm for each winch helps to manoeuvre two docked kites. Each arm 520 radiates outwardly from a central column 525. Each arm is coupled to a drive motor (not shown) which is coupled to a controller.

Having a separate arm for each winch reduces the load at the central column 525 since the two winches can be moved closer together by controlling their respective arms, thereby reducing the torque at the central column 525.

Alternatively, a single arm may be provided having a winch located at each end so that a constant angular separation between the winches (for example approximately 180 degrees) is maintained.

The controller is operable to control the drive motors to orientate the arms to a desired position. Each arm can be moved independently of the other arm or arms. Furthermore, each turntable is likewise coupled to a turntable motor and the turntable motor is also controlled by the controller. It is therefore possible to orientate one winch so that its respective airborne device faces into the wind while orientating a second winch so that its respective airborne device can be wound in.

The controller may be connected to a computer so that a user can manually move the arms and winches to a desired position. Alternatively, a flight plan may be entered to control the position of the arms and winches automatically in accordance with the flight plan.

FIGS. 5A and 5B show an arrangement having two winches. However, alternative embodiments of multiple winch systems can have three or more winches on respective turntables and having respective masts.

Embodiments described herein have referred to kites. Such kites may be rigid, soft or hybrid kites. However, it should be understood that alternative tethered airborne devices could be used such as rigid wings or blimps.

The invention claimed is:

1. A winch for a power generating system using a tethered airborne device, the winch comprising:
   a drum rotatable about its main axis;
   a guiding apparatus arranged to guide an airborne device tether to wind and unwind around the drum;
   wherein the drum is rotatable relative to a pivot point to move in a first plane and the guiding apparatus is disposed relative to the drum to move along part of an orbital path around the drum in a second plane substantially perpendicular to the main axis of the drum, thereby allowing alignment of the winch with respect to an unwound length of the tether; and wherein the guiding apparatus is arranged to move along part of the orbital path around the drum by moving along a curved track that is coaxial with respect to the drum and extends along a section of the orbital path.

2. The winch of claim 1, wherein the drum has a centre of gravity located between the pivot point and the unwound length of the tether.

3. The winch of claim 1, wherein the guiding apparatus comprises a guide piece to guide the tether on to a part of the drum proximate the guide piece when the winch is in a winding mode and to guide the tether away from a part of the drum proximate the guide piece when the winch is in an unwinding mode.

4. The winch of claim 1, wherein the guiding apparatus comprises a guide piece, and wherein the guide piece is arranged to move bidirectionally along a longitudinal track substantially parallel to the main axis of the drum and wherein the axis of the drum is fixed.

5. The winch of claim 1, further comprising a turntable on which the drum is mounted so that the main axis of the drum sits in a substantially horizontal plane, wherein the turntable is rotatable about a substantially vertical axis.

6. The winch of claim 1, further comprising a turntable on which the drum is mounted and further comprising a mast mounted on and fixed with respect to the turntable, the mast being arranged to facilitate launch and capture of the tethered airborne device.

7. The winch of claim 1, further comprising rails on which the drum is arranged to shuttle bidirectionally and a controller configured to control the movement of the drum with respect to the guiding apparatus to ensure alignment of the 5 guiding apparatus with a particular region of the drum.

8. The winch of claim 1, further comprising rails on which the drum is arranged to shuttle bidirectionally provided with a screw thread having a crossing helix.

9. The winch of claim 1, further comprising a cradle in which the drum is secured, wherein the drum is arranged to be rotatable in a substantially vertical plane.

10. The winch of claim 1, further comprising a motor configured to actuate movement of the drum around the pivot point.

11. The winch of claim 1, further comprising a controller to control movement of the drum in the first plane and movement of the guiding apparatus in the second plane in accordance with an airborne device flight plan.

12. The winch of claim 1, wherein the tether is a ribbon.

13. The winch of claim 1, wherein the tethered airborne device is a kite.

14. A winching system for plural tethered airborne devices, the system comprising a plurality of rotatable turntables coupled to a central column wherein a respective winch is mounted on each turntable.

15. The system of claim 14, wherein the plurality of turntables are coupled to the central column by at least one movable arm.

16. The system of claim 15, wherein each of a plurality of movable arms is movable independently of each of the other movable arms.

17. The system of claim 16, further comprising a drive motor and a controller coupled to said drive motor, wherein the controller is configured to control the drive motor to orientate one or more of the respective turntables and arms to a desired orientation.

18. The system of claim 14, further comprising respective masts mounted on each of the turntables, the masts being arranged to facilitate launch and capture of the tethered airborne devices.

* * * * *